(12) United States Patent
Abadpour et al.

(10) Patent No.: US 8,467,596 B2
(45) Date of Patent: Jun. 18, 2013

(54) METHOD AND APPARATUS FOR OBJECT POSE ESTIMATION

(75) Inventors: Arash Abadpour, Toronto (CA); Guoyi Fu, Vaughan (CA); Ivo Moravec, Scarborough (CA)

(73) Assignee: Seiko Epson Corporation, Tokyo (JP)

( * ) Notice: Subject to any disclaimer, the term of this patent is extended or adjusted under 35 U.S.C. 154(b) by 10 days.

(21) Appl. No.: 13/220,851

(22) Filed: Aug. 30, 2011

(65) Prior Publication Data
US 2013/0051626 A1    Feb. 28, 2013

(51) Int. Cl.
*G06K 9/00*    (2006.01)
(52) U.S. Cl.
USPC ........... 382/151; 382/100; 382/106; 382/153; 382/154; 382/199; 382/216; 348/135
(58) Field of Classification Search
USPC .................. 382/100, 106, 141, 151–154, 181, 382/199, 203, 209, 216, 286, 288, 325; 348/135
See application file for complete search history.

(56) References Cited

U.S. PATENT DOCUMENTS

| | | | | |
|---|---|---|---|---|
| 7,016,539 | B1 * | 3/2006 | Silver et al. | 382/216 |
| 7,158,656 | B2 * | 1/2007 | Covell et al. | 382/106 |
| 7,822,264 | B2 | 10/2010 | Balslev et al. | |
| 7,957,583 | B2 * | 6/2011 | Boca et al. | 382/154 |
| 2007/0162164 | A1 * | 7/2007 | Dariush | 700/61 |
| 2010/0259537 | A1 | 10/2010 | Ben-Himane et al. | |
| 2011/0157178 | A1 * | 6/2011 | Tuzel et al. | 345/426 |

OTHER PUBLICATIONS

Björn Johansson and Anders Moe, "Patch-Duplets for Object Recognition and Pose Estimation", IEEE, Proceedings of the Second Canadian Conference on Computer and Robot Vision, May 2005, pp. 9-16.*
Tony F. Chan and Luminita A. Vese, "Active Contours Without Edges", IEEE, Transactions on Image Processing, vol. 10, No. 2, Feb. 2001, pp. 266-277.*
Anthony J. Yezzi and Stefano Soatto, "Structure From Motion for Scenes Without Features", IEEE, Computer Society Conference on Computer Vision and Pattern Recognition, vol. 1, Jun. 2003, pp. 1-8.*

(Continued)

*Primary Examiner* — Eric Rush

(57) ABSTRACT

A pose of an object is estimated from an from an input image and an object pose estimation is then stored by: inputting an image containing an object; creating a binary mask of the input image; extracting a set of singlets from the binary mask of the input image, each singlet representing points in an inner and outer contour of the object in the input image; connecting the set of singlets into a mesh represented as a duplex matrix; comparing two duplex matrices to produce a set of candidate poses; and producing an object pose estimate, and storing the object pose estimate. The estimated pose of the object is refined by: inputting an image of an object in an estimated pose, a model of the object, and parameters of a camera used to take the image of the object in the estimated pose; projecting the model of the object into a virtual image of the object using the parameters of the camera and initial pose parameters to obtain a binary mask image and image depth information; and updating the initial pose parameters to new pose parameters using the binary mask image and image depth information and updating the new pose parameters iteratively to minimize an energy function or until a maximum number of iterations is reached.

20 Claims, 7 Drawing Sheets

OTHER PUBLICATIONS

Fredrik Viksten, "Object Pose Estimation using Patch-Duplet/SIFT Hybrids", Proceedings of the 11th IAPR Conference on Machine Vision Applications, 2009, pp. 134-137.*

Fredrik Viksten, Per-Erik Forssen, Bjorn Johansson, and Anders Moe, "Comparison of Local Image Descriptors for Full 6 Degree-of-Freedom Pose Estimation", IEEE International Conference on Robotics and Automation, May 2009, pp. 2779-2786.*

Matching and Pose Refinement with Camera Pose Estimates, Satyan Coorg and Seth Teller, MIT Computer Graphics Group, 545 Technology Square NE43-217, Cambridge, MA 02139, Proc. 1997 Image Understanding Workshop, (pp. 857-862), May 1997.

Active Contours Without Edges, Tony F. Chan, Member, IEEE and Luminita A. Vese, IEEE Transactions on Image Processing, vol. 10. No. 2, (pp. 266-277) Feb. 2001.

Pose Estimation via Gauss-Newton-on-manifold, Pei Yean Lee and John B. Moore, Department of System Engineering, RSISE, Australian National University, ACT 0200, Australia and National ICT Australia Limited, Locked Bag 8001, Canberra, ACT 2601, Australia, Jan. 2005.

Robust 3D Pose Estimation and Efficient 2D Region-Based Segmentation from a 3D Shape Prior, Samuel Dambreville, Romeil Sandhu, Anthony Yezzi, and Allen Tannenbaum, Georgia Institute of Technology, In Proc. European Conf. on Computer Vision (ECCV), vol. 5303, (pp. 169-182), Jan. 2008.

Pose Refinement of Active Models Using Forces in 3D, A. D. Worrall, G. D. Sullivan and K. D. Baker, Dept. of Computer Science, University of Reading, Reading, UK, RG6 2AY, ECCV (1) (pp. 341-350), Jan. 1994.

* cited by examiner (a)

(b)

(c)

(d)

METHOD AND APPARATUS FOR OBJECT POSE ESTIMATION

FIELD OF INVENTION

In the many industrial settings today, robots are used for parts assembly and manufacturing. These robots are equipped with one or more cameras, e.g. CCD and CMOS, which give them vision. Often, objects (i.e. parts) are contained in a bin. The robot must recognize the object/part in the bin so it can pick it up to assemble the product. However, the object can be in any number of poses (position, orientation, rotation). So, the robot must be trained to recognize the part regardless of its pose. The present invention relates to estimating the pose of a three-dimensional (3D) object from two-dimensional images (e.g. camera images) so that a robot can be trained to recognize the object regardless of its pose as seen from its on-board camera. As is known in the art, robots include software that attempt to identify the object from the camera image. Therefore it important for such software to have a robust and accurate database of object images with which to compare to the image captured by the robot camera.

SUMMARY OF INVENTION

One aspect of the present invention is a method and apparatus for estimating a pose of an object from an input image and storing an object pose estimation, comprising: inputting an image containing an object; creating a binary mask of the input image; extracting a set of singlets from the binary mask of the input image, each singlet representing points in an inner and outer contour of the object in the input image; connecting the set of singlets into a mesh represented as a duplex matrix; comparing two duplex matrices to produce a set of candidate poses; and producing an object pose estimate, and storing the object pose estimate.

In an embodiment of the invention, a plurality of images of the object are input, each image containing a view of the object that is different than a view in each other of the plurality of images. One aspect comprises generating the view in each of the plurality of images of the object using a CAD model for the object. Another aspect comprises generating the view in each of the plurality of images of the object using a robot equipped with a camera.

A further aspect of the invention comprises detecting the object in the input image and calculating a bounding box of the object. Another aspect comprises extracting inner and outer contours of the object.

In another embodiment of the invention, the object pose estimate is refined by modeling the pose estimate as an optimization of an energy function. In one aspect, the invention calculates pose estimates iteratively to minimize an energy value in the energy function. Another aspect calculates a velocity screw to iteratively calculate pose estimates. Another aspect projects a model contour curve of the object into a virtual image using a rendering application programming interface (API) such as OpenGL, DirectX, ray tracing, etc.

In a further embodiment of the invention, the object pose estimate is refined by: inputting an image of an object in an estimated pose, a model of the object, and parameters of a camera used to take the image of the object in the estimated pose; projecting the model of the object into a virtual image of the object using the parameters of the camera and initial pose parameters to obtain a binary mask image and image depth information; updating the initial pose parameters to new pose parameters using the binary mask image and image depth information and updating the new pose parameters iteratively to minimize an energy function or until a maximum number of iterations is reached.

Another aspect of the invention comprises: calculating a mean value inside and outside the object using a cost function; and calculating a contour C of the object from the binary mask image and 3D contour points using the image depth information.

A further aspect comprises: calculating a gradient $\nabla T(x,y)$ in x and y direction for the contour points; calculating the image Jacobian matrix; and calculating a gradient flow and velocity screw using a Gaussian Newton method.

Another aspect of the present invention comprises calculating a relative displacement using the velocity screw and a given stepwise.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
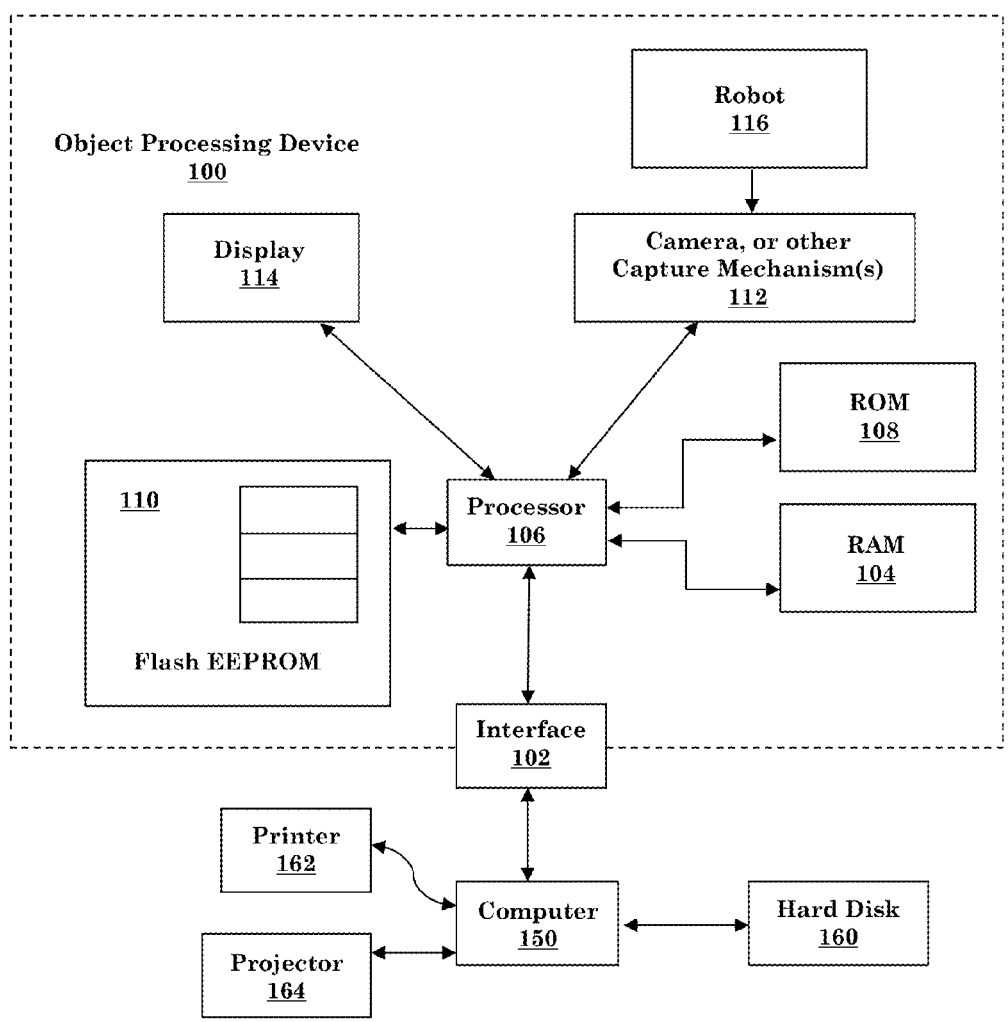
FIG. 1 is a general block diagram of an object processing device and system for utilizing the present invention.

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for examining an image, particularly a digital image of one or more objects. The image is examined to estimate the pose (position and orientation) of a corresponding 3D object represented in the 2D image. Example embodiments create a binary mask of an image and extract a set of singlets from the binary mask. Each singlet will represent points in an inner and outer contour of the object. The set of singlets are connected into a mesh represented as a duplex matrix. Two duplex matrices are compared to produce a set of candidate poses. An object pose estimate is then produced and stored for later use, for example in a vision system for robotic parts assembly.

A schematic representation of an example object processing device 100 is shown in FIG. 1. The object processing device 100 exchanges data with a host computer 150 by way of an intervening interface 102. Application programs and an object processing device driver may also be stored for access on the host computer 150. When an image retrieve command is received from the application program, for example, the object processing device driver controls conversion of the command data to a format suitable for the object processing device 100 and sends the converted command data to the object processing device 100. The driver also receives and interprets various signals and data from the object processing device 100, and provides necessary information to the user by way of the host computer 150.

When data is sent by the host computer 150, the interface 102 receives the data and stores it in a receive buffer forming part of a RAM 104. The RAM 104 can be divided into a number of sections, for example through addressing, and allocated as different buffers, such as a receive buffer or a send buffer. Data, such as digital image data, can also be obtained by the object processing device 100 from the capture mechanism(s) 112, the flash EEPROM 110, or the ROM 108. The capture mechanism(s) 112 can be a camera, for example, and generate a digital image by photographing one or more objects, such as a part to be used in manufacturing and/or assembly of a device such as a printer. A camera 112 can be controlled by robot 116, for example, or a human, or can be automatically controlled by computer 150, for example. The digital image of the object(s) can then be stored in the receive buffer or the send buffer of the RAM 104.

A processor 106 uses computer-executable instructions stored on a ROM 108 or on a flash EEPROM 110, for example, to perform a certain function or group of functions, such as the method 200 (FIG. 2) for example. Method 200 will be discussed in greater detail later herein. Where the data in the receive buffer of the RAM 104 is a digital image, for example, the processor 106 can implement the methodological acts of the method 200 on the digital image to extract features in the digital image and further analyze the image based on the extracted features. Further processing in an imaging pipeline may then be performed on the digital image before the image is displayed on a display 114, such as an LCD display for example, or transferred to the host computer 150, for printing on printer 162, projected with projector 164, or stored on hard disk 160, for example.

The example method 200 and variations thereof disclosed herein can be implemented using non-transitory computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store program code in the form of computer-executable instructions or data structures and that can be accessed by a processor of a general purpose or special purpose computer. Combinations of the above should also be included within the scope of computer-readable media.

Computer-executable instructions comprise, for example, instructions and data that cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination.

Input Image Specifications

Figure 2:
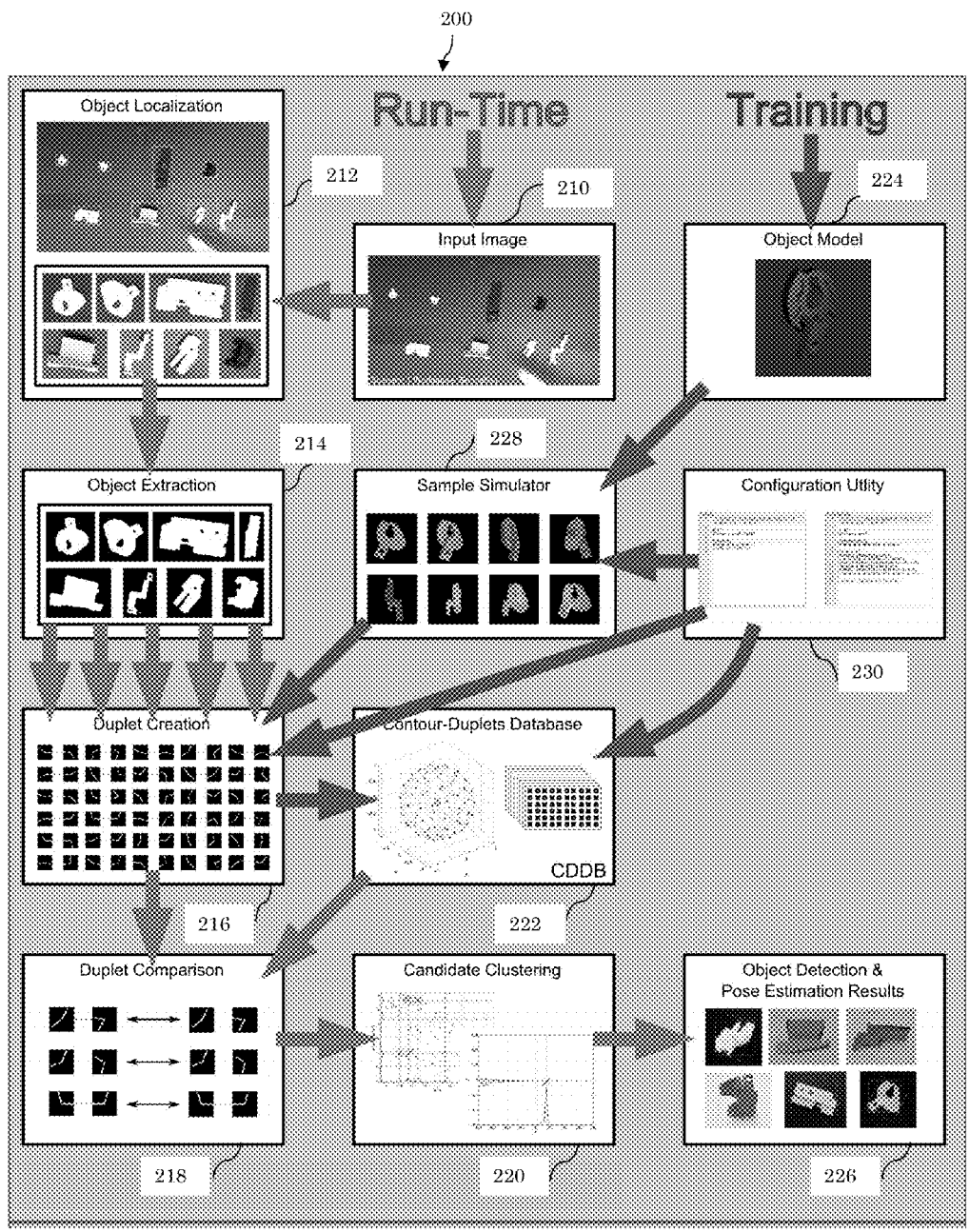
FIG. 2 is a flowchart of the general method of the present invention.

Referring to FIG. 2, the first step in method 200 is inputting an image (step 210). The input images can be generated by robot 116 operating a camera (capture mechanism) 112. If the input image contains one object, then it should preferably occupy at least 10% of the image area. If there is more than one object in the scene, the object of interest should preferably be at least two times larger than any other object in the image (scene). The input image can also be a CAD model of the object stored, for example, in RAM 104 or hard disk 160. In a preferred embodiment, a plurality of images of the object are input and analyzed as described below. Each of the plurality of images preferably contains a view of the object that is different than a view shown in each of the other images. These plurality of images can be generated using the CAD model and/or robot 116 operating a camera.

Object Localization and Extraction

The Object Localization (step 212) and Object Extraction (step 214) stages of the present invention detect the object present in the image or scene and calculate its bounding-box. The Object Extraction stage also extracts the contours, both inner and outer, of the object. These steps/stages are shown in greater detail in FIG. 3.

Generally speaking, these steps process single-channel images 310 (FIG. 3) that contain one or more objects on a plain background. These steps essentially discover areas of activity in the image and therefore may be sensitive to artifacts in the background. Objects in the input image are preferably single-color and with a minimum of contrast between the background and the objects. There is no additional limitation on the color of the background or that of the different objects. Some of the objects may be darker than the background and some may be brighter than it. Objects may have similar or different colors.

Figure 3:
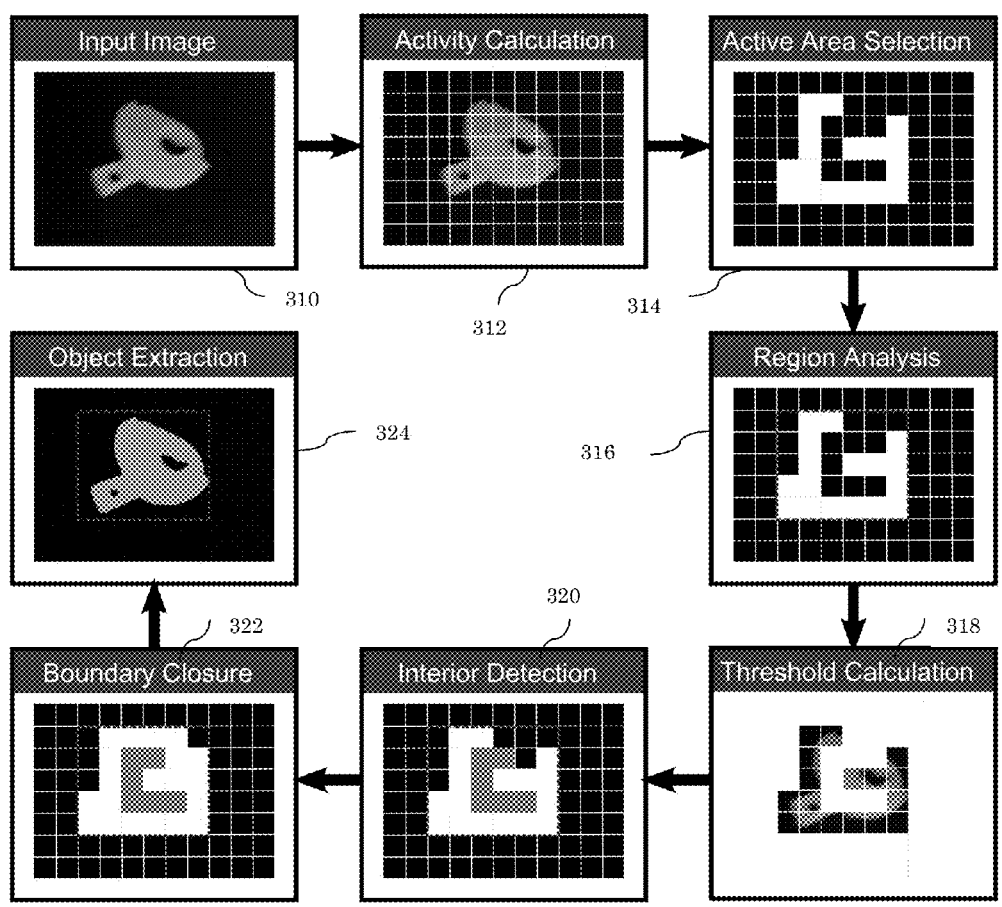
FIG. 3 is a flowchart of the object extraction stage of the method shown in FIG. 2.

Activity Calculation (FIG. 3, step 312)

During the Activity Calculation step, the image 310 is divided into blocks of size S×S. S, which is a number of pixels. As an example, S is 8, but a different value can be selected according to the particular environment. This configuration parameter S is referred to herein as ACTIVITY.SCALE. This step then calculates the standard deviation and the average intensity for each block and returns the outputs as the two matrixes, standard (std) and average (ave).

Active Area Selection (step 314)

In this step, the present invention compares the elements of the matrix std to a threshold and identifies those elements that exceed a threshold, which can be selected for a particular environment. For example, this could be a color threshold. If 8 bits are used to represent a color depth, then the threshold would be set to somewhere between 0 and 255. As will be appreciated, the active area selection step identifies pixel blocks corresponding to the color object as contrasted to the plain background. The elements identified as exceeding a selected activity threshold are input to an Activity Map.

Region Analysis (step 316)

The Region Analysis step 316 performs blob analysis on the Activity Map produced in previous step 314. The parameters used in this step are size, controlled by OBJECTS.SIZE.MIN (default value is 0.001) and OBJECTS.SIZE.MAX (default value is 0.1), and number of candidate regions OBJECTS.COUNT (default value is 8). The size limitations are first divided by the square of ACTIVITY.SCALE in order to convert these configuration parameters from pixels to blocks. The Region Analysis step returns the bounding box for each object, as well as its first- and second-order means and area.

During the Region Analysis step each region is given an index. The indexes of the regions start from one but are not necessarily subsequent. In other words, there are missing index values, corresponding to regions which have not matched the size constraints. An index map carries the index assigned to each block. This map is called the Boundary Map. Any block given a non-zero index in the Boundary Map is a boundary block. The rest of the blocks are either background or represent the interior of an object. The interior blocks are detected in step 320 described hereinafter.

Threshold Calculation (step 318)

The threshold calculation step 318 determines an optimal threshold for separating the contents of the boundary blocks for each region into foreground and background. This procedure is carried out through the following stages, done separately for each region. Here, I is the set of all the points that fall into one of the boundary blocks for the region.

1. Produce a 256-bin histogram for the contents of I.
2. Calculate t as the average of I.
3. Threshold I using the value of t and produce I$^+$ and I$^-$.
4. Calculate t$^+$ as the average of I$^+$.
5. Calculate t$^-$ as the average of I$^-$.
6. Calculate t* as (t$^-$+t$^-$)/2.
7. If the difference between t and t* is less than one, then return t as the threshold, otherwise set t=t* and go to 3.

The threshold calculated at this stage (OSMX_THRESHOLD) is used in later steps.

The Threshold Calculation step 318 also determines if the object is darker than the background or vice versa. This determination is based on inspecting the pixels at the boundary of the bounding-box for each object and determining the number of them that exceed the threshold. If this number is over half the total number of pixels tallied, then it is determined that the object is darker than the background. This information OSMX_INVERSE is used in later steps. For example OSMX_INVERSE could be set to 1 if the object is darker than the background and 0 if it is lighter.

Interior Detection (320)

The Interior Detection step 320 uses the Boundary Map and builds an Interior Map. This procedure starts with an all-zero Interior Map and for each region performs the following operation for each block in its bounding-box.

1. If the block is not in the Boundary Map, and if the average for the block is over or under (depending on how OE_INVERSE is set) the OE_THRESHOLD, and if this block has at least one 4-connected neighbors in the Boundary Map, then mark this block in the Interior Map.

Boundary Closure (step 322)

It is possible that the Boundary Map does not enclose the Interior Map. As a result, and according to the nature of the Object Extraction stage, described next, unwanted "dents" may appear in the extracted object. In order to resolve this issue, the Boundary Closure step 322 closes the Boundary Map for each region by performing the following operation within the bounding-box of each region, 1. If the block is not in either the Boundary Map or the Interior Map and if it has at least one 4-connected neighbor in the Interior Map, then mark this block in the Boundary Map.

Object Extraction (step 324)

The Object Extraction step 324 extracts the objects based on the Boundary Map and the Interior Map. This procedure performs the following operations for each object, within its own bounding-box.

1. If this block is marked in the Interior Map, then set all the pixels corresponding to it as belonging to the object.
2. If this block is marked in the Boundary Map, then set all the pixels corresponding to it as belonging to the object if the average for the block is over or under (depending on how OE_INVERSE is set) the OE_THRESHOLD.

Duplet Creation (FIG. 2, step 216)

Duplet Creation is the last step in the present invention where the actual images are used. After this stage, the work is done on Duplet Matrixes and other feature points and vectors.

Duplet Creation contains three sub-blocks of Contour-Tracing, Singlet Detection, and Duplet Creation, each described below.

Contour-Tracing

Contour-Tracing is the procedure that traces all the contours returned by the Object Extraction stage. The information collected at this stage is used in the Singlet Detection procedure. Any known contour-tracing algorithm can be used in the present invention, which is not limited to a particular algorithm. Examples of contour-tracing algorithms that may be utilized include Square Tracing, Moore-Neighbor, Radial Sweep. In a preferred embodiment Theo Pavlidis' algorithm is used.

Singlet Detection

This stage depends on the two parameters TRACE_WINDOW and SINGLET_DISTANCE, which can be selected for a particular environment. The default value for both of these parameters is 12 pixels. For all the contours which are longer than two times TRACE_WINDOW, the following procedure is carried out for each point on the contour:

1. Find the average X and Y coordinates for the TRACE_WINDOW points around the point on the contour.
2. Connect the point on the contour to the two points which are TRACE_WINDOW away to the left and to the right.
3. Find the two angles; call them the in-coming angle and the out-going angle.
4. Find the inner product of the two vectors which represent the incoming angle and the outgoing angle. Change the sign of this inner product and call it the Curvature.

5. Mark this point as a singlet if it has the highest Curvature in the SINGLET_DISTANCE points around it.
6. Store the X and Y coordinates for each singlet, as well as the in-coming and out-going angles and the Curvature corresponding to them.

Duplet Creation

Duplet Creation is the procedure that combines the detected singlets into duplets. The process of creating the duplets contains the following steps:
1. Produce the matrix D, with its (i,j) element containing the distance between the i-th and the j-th singlets.
2. Change all the elements of D that are below the minimum threshold or over the maximum threshold as NAN (Not a Number, an identifier that denotes a variable that has not been initialized). The minimum and the maximum thresholds are calculated as DISTANCE.MIN (default value is 0.01) and DISTANCE.MAX (default value is 0.25) multiplied with the smallest dimension of the image, respectively.
3. Produce an Sx1 array of all zeros and call it deg. deg(s) will contain the number of singlets that are connected to the s-th singlet.
4. Scan D until it only contains NANs or when a maximum number for the singlets is specified and that the maximum is reached.
5. Find the smallest element of D. Call that (s1,s2). Increment both deg(s1) and deg(s2). If either deg(s1) or deg(s2) is larger than the maximum degree DEGREE (default is 10), then set all elements in the row and column which correspond to the singlet as NAN. For example, if deg(s1) is larger than DEGREE, then for all s set D(s,s1) and D(s1,s) to NAN.
6. For the pair (s1,s2), calculate the angle that connects them together as well as the length of the line which connects them, call them angle and distance, respectively. Subtract angle from the in-coming and out-going angles of a temporary copy of both singlets. Now, the duplet will be represented as, <angle, distance, s1.in-coming, s1.out-going, s2.in-coming, s2.out-going>.
7. Return the Duplet Matrix.

Duplet Comparison (FIG. 2, step 218)

Duplet Comparison is the process of comparing the items in two Duplet Matrixes and producing a list of matches, and therefore a first list of candidate poses. Assuming that the two Duplet Matrixes are D1 and D2, the process is performed as follows:
1. For any duplets d1 in D1 and d2 in D2, determine if these condition are all satisfied, $|d1.s1.\text{in-coming} - d2.s1.\text{in-coming}| < \text{THRESHOLD}$, $|d1.s1.\text{out-going} - d2.s1.\text{out-going}| < \text{THRESHOLD}$, $|d1.s2.\text{in-coming} - d2.s2.\text{in-coming}| < \text{THRESHOLD}$, $|d1.s2.\text{out-going} - d2.s2.\text{out-going}| < \text{THRESHOLD}$.

Here, THRESHOLD is determined by the configuration variable DUPLETS.THRESHOLD.
   If these conditions are met, then add the candidate pose (d1.length/d2.length, d1.angle-d2.angle) to the list of candidates. Also take note of the X and Y coordinates of the two singlets and of both duplets. Tag this candidate as "straight".
2. Similarly, determine if these conditions are satisfied, $|d1.s1.\text{in-coming} - d2.s2.\text{in-coming}| < \text{THRESHOLD}$, $|d1.s1.\text{out-going} - d2.s2.\text{out-going}| < \text{THRESHOLD}$, $|d1.s2.\text{in-coming} - d2.s1.\text{in-coming}| < \text{THRESHOLD}$, $|d1.s2.\text{out-going} - d2.s1.\text{out-going}| < \text{THRESHOLD}$, in which case, a similar candidate pose will be added to the list, except for the angle which will be recorded as d1.angle-d2.angle-pi. This candidate will be tagged as "reverse".
3. Pass the list of candidates to the clustering stage described next.

Candidate Clustering (FIG. 2, step 220)

Candidate Clustering is the process taking in the pose candidates produced through Duplet Comparison and estimating a limited number of poses which are each represented by a large set of the candidates. This procedure contains two stages, Scale-Angle Clustering, and X-Y Clustering, both described below.

Scale-Angle Clustering

The aim of this stage is to produce a list of candidate (scale,angle) pairs based on the candidate poses produces through Duplet Comparison.

Assume that S and A are two 1xN carrying the candidate scale and angles. The Scale-Angle Clustering procedure is done as follows,
1. Produce S_L by calculating the base BASE logarithm of the values of S.
2. Produce the histograms of A and S_L, independently. Each histogram will contain BINS bins. The histogram for A will cover the range of -pi to pi. S_L will be analyzed in the range of SCALE.MIN and SCALE.MAX, both in base BASE.
3. Mark a point on either histogram as a 'peak' if it is higher than the D points to its right and higher or equal to the D points to its left.
4. Select the C1 highest peaks for each histogram independently.
5. Intersect every scale candidate with every angle candidate and produce a list of scale-angle candidates. Pass this list to the X-Y clustering stage. For each scale-angle candidate, also send the positions of the singlets in the matching duplets which resulted in this pair.
6. Calculate the confidence for each scale-angle candidate as the number of pairs of duplet matches which represent it divided by the smallest of the number of duplets in the two Duplet Matrixes.
7. If the number of scale-angle candidates exceeds C2, then pick the C2 ones with the highest confidence.

X-Y Clustering

The output of the Scale-Angle Clustering stage is a set of (scale,angle) candidates. The X-Y Clustering stage is the process of adding translation information to the candidates, as follows for each (scale,angle) candidate.
1. Modify the singlet positions for this candidate so that the center of the axis systems moves to the center of the image. This process will be carried out independently for the two Duplet Matrixes.
2. Rotate the query singlet positions by angle.
3. Scale the query singlets by scale.
4. Find the difference in X and Y, independently, for the singlet positions between the query and the reference. Call these dx and dy arrays.
5. At this stage, the dx-dy pairs can undergo a two-dimensional clustering algorithm similar to the one carried out on scale-angle pairs, or a quicker operation can follow.
6. Find the mean of dx and dy, independently and append this information to the scale-angle pair, thus producing the pose candidate (angle,scale,dx,dy,confidence). The confidence for this pose candidate will remain equal to the confidence for scale-angle pair.
7. If required by the configuration parameters, as described below, perform overlap examination.
8. Pick C2 candidates which correspond to the highest values of confidence and report them to the next stage.

Overlap Consideration

Overlap Consideration is only functional if OVERLAP is non-negative. The Overlap Consideration is done as follows,
1. Transform the reference bounding-box according to the (angle,scale,dx,dy,confidence) information. Find the smallest rectangle that covers the rotated, scaled, and shifted bounding-box.
2. Find the smallest rectangle that covers both the modified bounding-box of the reference and the bounding-box of the query. Call the area of this rectangle A.
3. Mark this candidate as inappropriate if min(A1,A2)/A is below OVERLAP. Here, A1 and A2 are the area of the modified bounding-box of the reference and the area of the query.
4. Eliminate candidates marked as inappropriate from the list.

Contour-Duplets Database (FIG. 2, 222)

A Contour-Duplets Database (CDDB) file contains a list of Duplet Matrixes, each accompanying an elevation and azimuth. For generating a CDDB file the algorithm described above will perform Duplet Creation on the training images (FIG. 2, 224) and will then store the resulting Duplet Matrixes in the CDDB 222 each accompanied with the elevation-azimuth representation. These samples are called the views.

CDDB files in practice are accompanied with a file that contains details about the training images. These details are necessary for producing different visualizations and are not needed for the regular operation of the algorithm.

When a query is run, the procedure is repeated for each view in the database. The final output of the algorithm is the CDDBC.SEARCH.CANDIDATES.TOTAL number of candidates with the highest corresponding confidence values. The angular representation of the views that have produced each candidate are then appended to each candidate, thus producing the (elevation, azimuth, angle, scale, dx, dy, confidence) representation of the pose. The results of the object detection steps outlined above are these representations of the pose, which are pose estimates, and are stored in memory, e.g. RAM 104 or hard disk 160. These pose estimates can then be used in robot recognition of the object/part in the assembly of a product.

Output Visualizations (FIG. 2, 226)

Different visualizations can be produced. Two of these visualizations are the Model View and the Overlay. Model View is the image of the matching training image modified to reflect scale, angle, and translation as well. Overlay is the overlay of the Model View on the query image.

Object Model Specifications

Currently, the training procedure requires images showing the object of interest in different poses, as governed by different parameters. A practical and more convenient method for producing these images is through the sample simulator 228, which is a three-dimensional visualization tool that produces the 3D views of the objects.

Configuration Utility (FIG. 2, 230)

As described above, different parts of the method of the present invention use different configuration parameters. Some exemplary (default) values of these parameters have been given in the forgoing description. However, these values can be set by a user to fit a particular environment. The Configuration Utility is an interactive tool that finds the proper values for these parameters and sets them accordingly using minimum intuitive input from the user.

The following sections describe the aspect of the present invention that refines the pose estimate of the object especially where the image of the object is a camera image.

The pose refinement of the present invention is modeled as an alignment problem. We start with a 3D model of the object of interest, i.e. the part that the robot has to identify and pick up, and camera parameters of the camera 112 that is used to image the object. The goal is to find the 3D (Euclidean, 6 degrees of freedom) transformation that is to be applied to the model so that it coincides with the object of interest in the image. As a result, the pose refinement is implemented as iterative optimization problem of a cost function. Apart from the object foreground covering cost, the cost function may involve an image matching cost that aligns or matches local feature points or boundaries feature points.

In order to better understand the algorithm, the camera project model, OpenGL virtual camera model and image Jacobian matrix will be derived before the definition of cost function and relaxation solution.

Camera Projection Model

Figure 4:
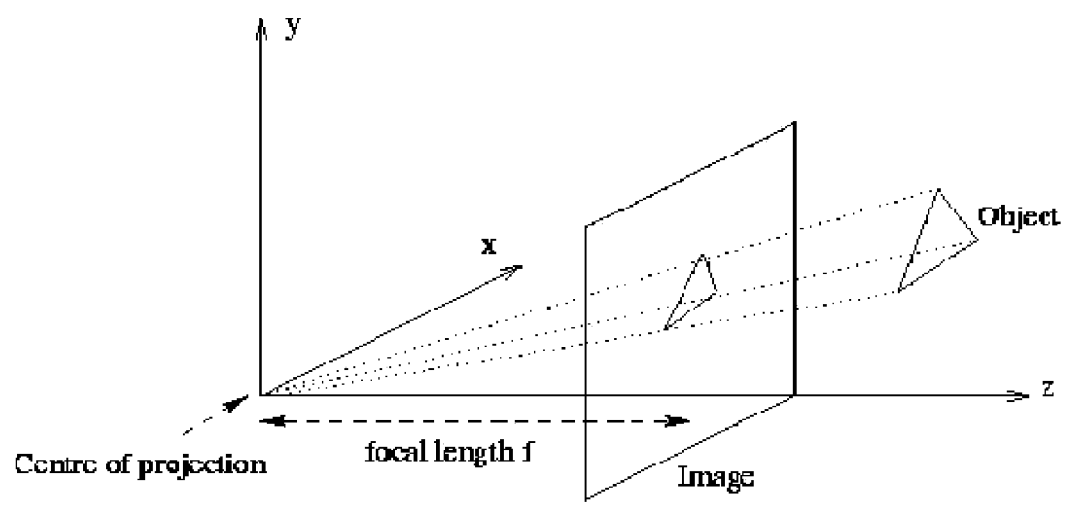
FIG. 4 illustrates a perspective projection in the pinhole camera model.

The camera projective model of the present invention is based on a pinhole camera model. The pinhole camera is the simplest, and the ideal, model of camera function. It has an infinitesimally small hole through which light enters before forming an inverted image on the camera surface facing the hole. As shown in FIG. 4, the perspective projection is the projection of a three-dimensional object onto a two-dimensional image plane. In reality, one must use a lens to focus an image onto the camera's focal plane. The focal plane is one particular plane that is parallel to the image plane. Assuming the pinhole camera coordinate is aligned with world coordinates, simple geometry shows:

$$\frac{x_{im}}{f} = \frac{x_w}{z_w} \text{ and } \frac{y_{im}}{f} = \frac{y_w}{z_w} \quad (1)$$

where $(x_w, y_w, z_w)$ is the object's point in the 3D world coordinates, and $(x_{im}, y_{im})$ is the point in 2D image plane coordinates.

The projection model from the camera frame coordinate to the pixel (image) coordinates is derived as:

$$\text{Let } CP = \begin{bmatrix} \frac{F}{S_x} & 0 & 0 \\ 0 & \frac{F}{S_y} & 0 \\ 0 & 0 & 1 \end{bmatrix} = \begin{bmatrix} \lambda_x & 0 & 0 \\ 0 & \lambda_y & 0 \\ 0 & 0 & 1 \end{bmatrix} \quad (2)$$

where F is the focal length, Sx and Sy are scaling factors in the x and y directions from the focal sensor plane to image or pixel coordinate. The Sx and Sy scaling factors are proportional to the CCD sensor cell width and height, and resolution. We can calibrate the camera to obtain the model scaling factor $\lambda_x$ and $\lambda_y$.

$$x_{im} - x_0 = \lambda_x \frac{x_c}{z_c} \text{ and } y_{im} - y_0 = \lambda_y \frac{y_c}{z_c} \quad (3)$$

where $(x_0, y_0)$ is the projection of the origin point of camera coordinate in the image or pixel coordinate.

Let $u=x_{im}-x_0$ and $v=y_{im}-y_0$, then equation (3) can be represented as:

$$u = \lambda_x \frac{x_c}{z_c} \text{ and } v = \lambda_y \frac{y_c}{z_c} \quad (4)$$

or $$\begin{bmatrix} u \\ v \\ 1 \end{bmatrix} = CP* \begin{bmatrix} x_c \\ y_c \\ z_c \end{bmatrix} = \begin{bmatrix} \lambda_x & 0 & 0 \\ 0 & \lambda_y & 0 \\ 0 & 0 & 1 \end{bmatrix} * \begin{bmatrix} x_c \\ y_c \\ z_c \end{bmatrix} \quad (5)$$

Image Jacobian Matrix

The image Jacobian matrix should be constructed based on the relationship between the velocity of some object in the workspace and the corresponding changes that occur in the observed image of the workspace.

The current projection of feature point S has coordinates f=(u,v). The image Jacobian matrix is estimated as follows.

$$\dot{f} = J(r)\dot{r}$$

$$\dot{r} = [V; \Omega]^T = [v_x, v_y, v_z, w_x, w_y, w_z]^T$$

$$J(r) = \left[\frac{\partial f}{\partial r}\right] = \begin{bmatrix} \frac{\partial f_1(r)}{\partial r_1} & \cdots & \frac{\partial f_1(r)}{\partial r_m} \\ \cdots & & \cdots \\ \frac{\partial f_k(r)}{\partial r_1} & \cdots & \frac{\partial f_k(r)}{\partial r_m} \end{bmatrix}$$

Consider a point P with coordinates $(x_c, y_c, z_c)$ or $(x, y, z)$ in the camera frame. Using perspective projection, P's image plane coordinates are given by equation (4).

$$u = \lambda_x \frac{x}{z} \text{ and } v = \lambda_y \frac{y}{z} \quad (6)$$

In order to construct the image Jacobian for a single point with coordinates (x, y, z) in the camera frame, the formula is derived in following steps:

Compute the time derivatives for u and v.

Express these in terms of u, v, $\dot{x}$, $\dot{y}$, and $\dot{z}$ and z.

Find expressions for $\dot{x}$, $\dot{y}$, and $\dot{z}$ in terms of the control input (the velocity screw) $\dot{r}=[V;\Omega]^T=[v_x,v_y,v_z,w_x,w_y,w_z]^T$ and x, y, z.

Combine the equations and solve the algebra.

Step 1: Using the quotient rule $$\dot{u} = \lambda_x \left(\frac{\dot{x}}{z} - \frac{x\dot{z}}{z^2}\right) = \lambda_x \frac{\dot{x}z - x\dot{z}}{z^2} \quad (7)$$

$$\dot{v} = \lambda_y \left(\frac{\dot{y}}{z} - \frac{y\dot{z}}{z^2}\right) = \lambda_y \frac{\dot{y}z - y\dot{z}}{z^2}$$

Step 2: The perspective projection equations can be rewritten to give expressions for x and y as $$x = \frac{uz}{\lambda_x} \text{ and } y = \frac{vz}{\lambda_y} \quad (8)$$

Substitute these into the equations (7)

$$\dot{u} = \lambda_x \left(\frac{\dot{x}}{z} - \frac{x\dot{z}}{z^2}\right) = \lambda_x \frac{\dot{x}}{z} - \frac{u\dot{z}}{z} \quad (9)$$

$$\dot{v} = \lambda_y \left(\frac{\dot{y}}{z} - \frac{y\dot{z}}{z^2}\right) = \lambda_y \frac{\dot{y}}{z} - \frac{v\dot{z}}{z}$$

Step 3: The velocity of (the fixed point) P relative to the camera frame is given by $$\dot{P} = -\Omega \times P - V$$

or $$\begin{bmatrix} \dot{x} \\ \dot{y} \\ \dot{z} \end{bmatrix} = - \begin{bmatrix} 0 & z & -y \\ -z & 0 & x \\ y & -x & 0 \end{bmatrix} \begin{bmatrix} w_x \\ w_y \\ w_z \end{bmatrix} - \begin{bmatrix} v_x \\ v_y \\ v_z \end{bmatrix} \quad (10)$$

where the velocity screw $\dot{r}=[V;\Omega]^T=[v_x,v_y,v_z,w_x,w_y,w_z]^T$

Expanding equation (10)

$$\dot{x} = -v_x - w_y z + w_z y$$

$$\dot{y} = -v_y - w_z x + w_x z$$

$$\dot{z} = -v_z - w_x y + w_y x \quad (11)$$

Step 4: Combine equations we obtain $$\dot{u} = -\frac{\lambda_x}{z} v_x + \frac{u}{z} v_z + \frac{uv}{\lambda_y} w_x - \frac{\lambda_x^2 + u^2}{\lambda_x} w_y + \frac{\lambda_x v}{\lambda_y} w_z$$

$$\dot{v} = -\frac{\lambda_y}{z} v_y + \frac{v}{z} v_z + \frac{\lambda_y^2 + v^2}{\lambda_y} w_x - \frac{uv}{\lambda_x} w_y - \frac{\lambda_y u}{\lambda_x} w_z$$

These equations can be written in image Jacobian matrix form.

$$\begin{bmatrix} \dot{u} \\ \dot{v} \end{bmatrix} = J(r)\dot{r} = \begin{bmatrix} -\frac{\lambda_x}{z} & 0 & \frac{u}{z} & \frac{uv}{\lambda_y} & -\frac{\lambda_x^2+u^2}{\lambda_x} & \frac{\lambda_x v}{\lambda_y} \\ 0 & -\frac{\lambda_y}{z} & \frac{v}{z} & \frac{\lambda_y^2+v^2}{\lambda_y} & -\frac{uv}{\lambda_y} & -\frac{\lambda_y u}{\lambda_x} \end{bmatrix} \begin{bmatrix} v_x \\ v_y \\ v_z \\ w_x \\ w_y \\ w_z \end{bmatrix} \quad (12)$$

OpenGL Virtual Camera Model

Figure 5:
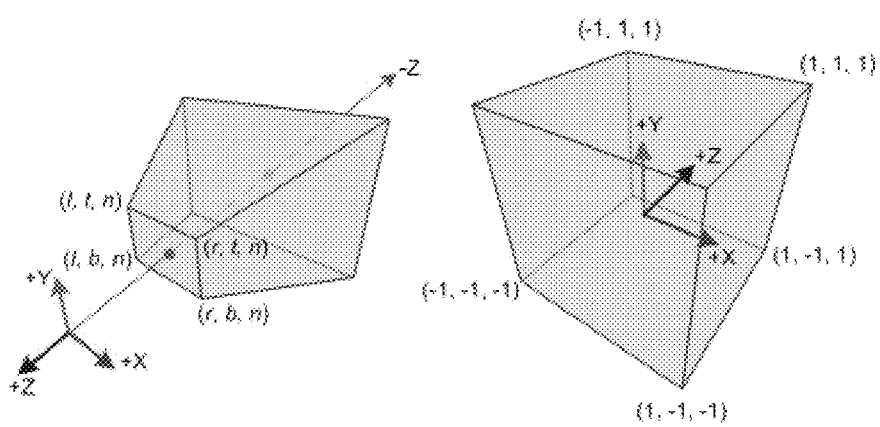
FIG. 5 illustrates and OpenGL projection and Normalized Device Coordinates (NDC)

To project a model onto an image, the present invention preferably uses OpenGL, which can execute high-speed rendering and hidden-line removal with existing hardware. In addition, OpenGL can store the depth information at each pixel. Using this information the 3D points corresponding to each contour point are calculated. FIG. 5 illustrates the OpenGL projection and Normalized Device Coordinates (NDC). Although OpenGL is used in a preferred embodiment, the present invention is not limited to this rendering application programming interface (API), and other rendering APIs such as DirectX, ray tracing, etc. may be utilized.

In perspective projection, a 3D point in a truncated pyramid frustum (eye coordinates) is mapped to a cube (NDC); the x-coordinate from [1, r] to [−1, 1], the y-coordinate from [b, t] to [−1, 1] and the z-coordinate from [n, f] to [−1, 1].

The projection matrix transforms a vertex in eye coordinate system to the clip coordinate system.

$$\begin{pmatrix} X_{clip} \\ Y_{clip} \\ Z_{clip} \\ W_{clip} \end{pmatrix} = \begin{vmatrix} \dfrac{\cot(fovy/2)}{2} & 0 & 0 & 0 \\ 0 & \cot(fovy/2) & 0 & 0 \\ 0 & 0 & \dfrac{Far+Near}{Near-Far} & \dfrac{2*Far*Near}{Near-Far} \\ 0 & 0 & -1 & 0 \end{vmatrix} \begin{pmatrix} X_e \\ Y_e \\ Z_e \\ 1 \end{pmatrix} \quad (13)$$

By applying the scaling matrix and pixel coordinate calculation the new projection of a 3D vertex in OpenGL is as follows.

$$u_{virtual} = \frac{\cot(fovy/2)}{\text{aspect}} \frac{\text{width}}{2}\left(\frac{X_e}{Z_e}\right) + \left(\frac{\text{width}}{2} + x_0\right) \quad (14)$$

$$v_{virtual} = -\cot(fovy/2)\frac{\text{height}}{2}\left(\frac{Y_e}{Z_e}\right) + \left(\frac{\text{height}}{2} + y_0\right)$$

We can find the correspondence of the OpenGL virtual camera to the real camera model using equation (3) and (14).

It should be noted that the definition of camera coordinate and OpenGL virtual camera eye coordinate are different. As a result, the following transformation is required to derive a correspondence between the two coordinates.

$$\begin{pmatrix} X_{cam} \\ Y_{cam} \\ Z_{cam} \\ 1 \end{pmatrix} = \begin{vmatrix} 1 & 0 & 0 & 0 \\ 0 & -1 & 0 & 0 \\ 0 & 0 & -1 & 0 \\ 0 & 0 & 0 & 1 \end{vmatrix} \begin{pmatrix} X_e \\ Y_e \\ Z_e \\ 1 \end{pmatrix} \quad (15)$$

In the present invention, OpenGL is used only to project the model. All the equations by default are derived using the real camera model.

2.4 Cost Function

The pose refinement method of the present invention minimizes an energy based cost function. The cost function is defined with a minimum so that the model projection using 3D pose (6DoF) coincides with the object of interest in the image.

$$E = F_1 + F_2 = \int T(x,y)*(I(x,y)-u_1)^2 dxdy + \int (1-T(x,y))*(I(x,y)-u_2)^2 dxdy \quad (16)$$

where $I(x,y)$ is the input image and $T(x,y)$ is the binary mask image of the model projection with given 3D pose.

The binary mask $T(x,y)$ image is the projection of the model for a given 3D pose and camera parameters with the definition as follows:

$$T(x,y) = \begin{cases} 1 & \text{if } (x,y) \text{ inside} \\ 0 & \text{outside} \end{cases} \quad (17)$$

The OpenGL can execute high-speed rendering of the binary mask image by projecting the object model into a 2D virtual image.

The $u_1$ and $u_2$ are the mean value of the input image inside and outside the object mask defined as:

$$u_1 = \frac{\int T(x,y)*I(x,y)dxdy}{\int T(x,y)dxdy} \quad (18)$$

$$u_2 = \frac{\int (1-T(x,y))*I(x,y)dxdy}{\int (1-T(x,y))dxdy}$$

The projected model contour curve C can be obtained from $T(x,y)$, which separates the image into "inside" object and "outside" object. The term $F_1$ is the fitting energy inside object and $F_2$ is the fitting energy outside object.

The basic idea of the cost function in a simple case is explained as follows. Assume the image $I(x,y)$ is formed by two regions of approximately piecewise-constant intensities, of distinct values of $u_{obj}$ and $u_{back}$ for the object and background. The boundary of the object in the image $I(x,y)$ is denoted by $C_0$. If the projected model contour curve C coincides with object boundary $C_0$ in image $I(x,y)$, then we have $u_1 = u_{obj}$ inside the object and $u_2 = u_{back}$ outside the object, as a result, we can have $$\inf\{F_1(C)+F_2(C)\} \approx 0 \approx F_1(C_0)+F_2(C_0).$$

In this case, it evident that the energy function is minimized when the projected model contour curve C coincides with object boundary $C_0$ in the image.

Figure 6:
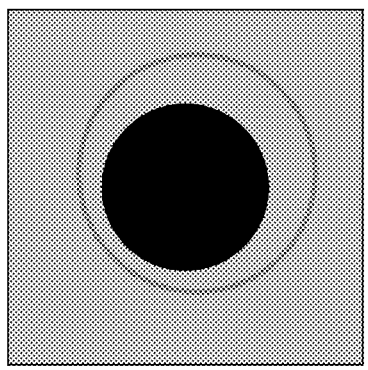
FIG. 6 (a) to (d) illustrates all four possible cases of the position of the projected model curve relative to the boundary of the object.
Figure 6:
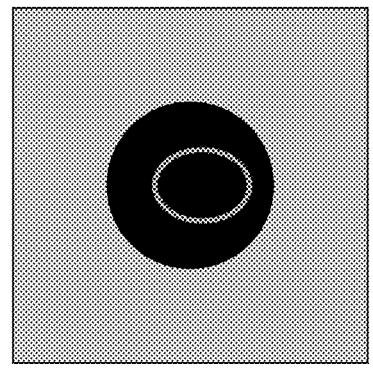
Figure 6:
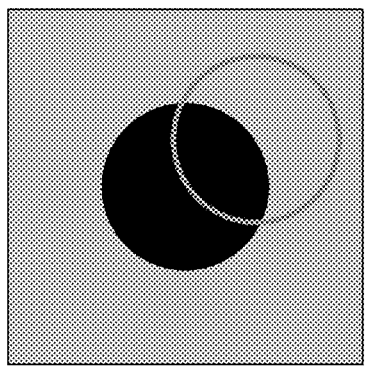
Figure 6:
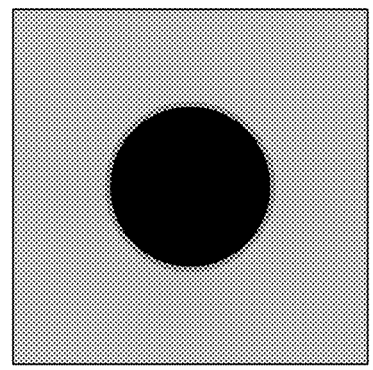

This can be seen in the simple case as shown in FIG. 6, which illustrates all possible cases of the position of the projected model curve. For instance, if the curve C is outside the object as FIG. 6 (a), $F_1(C)>0$ and $F_2(C) \approx 0$. If the curve C is inside the object as FIG. 6 (b), then $F_1(C) \approx 0$ and $F_2(C)>0$. If the curve C is both inside and outside the object as FIG. 6 (c), then $F_1(C)>0$ and $F_2(C)>0$. Finally, the fitting energy is minimized if $C=C_0$ the projected model curve C is on the boundary of the object as shown in FIG. 6 (d), where $F_1(C) \approx 0$ and $F_2(C) \approx 0$.

Based on our cost function definition, the pose estimate stored in RAM 104 or hard disk 160, for example, will be updated to minimize the above fitting term and we can add some other terms or constraints from matched feature points or boundary features. For example, if there is a set of matched feature points (e.g j=1 ... N matched pairs) between 2D input image $p_j=(p_{jx}, p_{jy})^T$ and 3D model features $P_j=(X_j^{obj}, Y_j^{obj}, Z_j^{obj})$, which are projected in the virtual image as $\pi(P_j)=(u_j, v_j)^T$. The additional constraining term may be defined as:

$$E_{match} = \sum_{j=1}^{N} w_j * \|\pi(P_j) - p_j\| = \sum_{1}^{M} w_i *((u_j - p_{jx})^2 + (v_j + p_{jy})^2) \quad (19)$$

where $w_j$ is the weight for feature match, which may be the match confidence or score, the $\pi(P_j)=(u_j,v_j)^T$ is denote the projection of model feature point from $P_i=(X_i^{obi}, Y_i^{obi}, Z_i^{obi})$ to image with given 3D pose. The $\| \|$ may be the Euclidean distance in the image coordinate.

The equation (17) or match energy minimization can provide the initial pose estimation for refinement. It may be also used as a constraining term for pose refinement so that it can improve the convergence and robustness.

Then the cost function may be defined as $$E = E_c + \eta * E_{match} = F_1 + F_2 + \eta * \sum_{1}^{N} w_i * \|\pi(P_i) - p_i\| \quad (20)$$

where the $\eta$ is a weight function to balance energy between $E_c$ and $E_{match}$.

We will derive the gradient flow for both $E_c$ and $E_{match}$, however in our initial implementation, we only use the energy of $E_c$ with $\eta=0$.

Calculate the velocity screw for iteratively updating the pose

Following the gradient descent method, the energy E is expected to approach a minimum. Iteratively update the pose parameters or the velocity screw $\dot{r}=[V;\Omega]^T=[v_x,v_y,v_z,w_x,w_y,w_z]^T$ that minimizes E undertaken via gradient descent.

The partial differentials of E with respect to the pose parameter r can be computed using the chain rule.

$$E_c = \int T(x,y) * (I(x,y) - u_1)^2 dxdy +$$
$$\int (1 - T(x,y)) * (I(x,y) - u_2)^2 dxdy$$

$$E_{match} = \sum_{j=1}^{N} w_j * \|\pi(P_j) - p_j\| = \sum_{1}^{M} w_i * ((u_j - p_{jx})^2 + (v_j - p_{jy})^2)$$

The Partial Differential of $E_c$

We first derive the partial differential of $E_c$ $$\frac{\partial E_c}{\partial r_i} = \int \frac{\partial T(x,y)}{\partial r_i}(I(x,y) - u_1)^2 dxdy + \qquad (21)$$
$$\int T(x,y) * 2 * (I(x,y) - u_1)\frac{\partial u_1}{\partial r_i} dxdy -$$
$$\int \frac{\partial T(x,y)}{\partial r_i}(I(x,y) - u_2)^2 dxdy +$$
$$\int (1 - T(x,y)) * 2 * (I(x,y) - u_2)\frac{\partial u_2}{\partial r_i} dxdy =$$
$$\int ((I(x,y) - u_1)^2 - (I(x,y) - u_2)^2)\frac{\partial T(x,y)}{\partial r_i} dxdy +$$
$$\int T(x,y) * 2 * (I(x,y) - u_1)\frac{\partial u_1}{\partial r_i} dxdy +$$
$$\int (1 - T(x,y)) * 2 * (I(x,y) - u_2)\frac{\partial u_2}{\partial r_i} dxdy$$

For the second and third term, we can prove they are zero.

$$\int T(x,y) * 2 * (I(x,y) - u_1)\frac{\partial u_1}{\partial r_i} dxdy = \qquad (22)$$
$$2 * \frac{\partial u_1}{\partial r_i}\left(\int T(x,y)(I(x,y) - u_1)dxdy\right) =$$
$$2 * \frac{\partial u_1}{\partial r_i}(u_1 * A_{in} - u_1 A_{in}) = 0$$

where $A_{in} = \int T(x,y) dxdy$ is the area inside the object.

$$\int (1 - T(x,y)) * 2 * (I(x,y) - u_2)\frac{\partial u_2}{\partial r_i} dxdy = \qquad (23)$$
$$2 * \frac{\partial u_2}{\partial r_i}\left(\int (1 - T(x,y))(I(x,y) - u_2)dxdy\right) =$$
$$2 * \frac{\partial u_2}{\partial r_i}(u_2 * A_{out} - u_2 A_{out}) = 0$$

where $A_{out} = \int (1-T(x,y)) dxdy$ is the area outside the object. Therefore, we can get:

$$\frac{\partial E_c}{\partial r_i} = \int ((I(x,y) - u_1)^2 - (I(x,y) - u - 2)^2)\frac{\partial T(x,y)}{\partial r_i} dxdy \qquad (24)$$

The binary mask T(x,y) image is the projection of model for given 3D pose and camera parameters.

$$\frac{\partial T(x,y)}{\partial r_i} = \frac{\partial T(x,y)}{\partial x}\frac{\partial x}{\partial r_i} + \frac{\partial T(x,y)}{\partial y}\frac{\partial y}{\partial r_i} \qquad (25)$$

From the image Jacobian matrix in equation (12), the $$\frac{\partial x}{\partial r_i} \text{ and } \frac{\partial y}{\partial r_i}$$

can be obtained as follows.

$$\begin{bmatrix} \frac{\partial x}{\partial r_1} & \frac{\partial x}{\partial r_2} & \frac{\partial x}{\partial r_3} & \frac{\partial x}{\partial r_4} & \frac{\partial x}{\partial r_5} & \frac{\partial x}{\partial r_6} \\ \frac{\partial y}{\partial r_1} & \frac{\partial y}{\partial r_2} & \frac{\partial y}{\partial r_3} & \frac{\partial y}{\partial r_4} & \frac{\partial y}{\partial r_5} & \frac{\partial y}{\partial r_6} \end{bmatrix} = \qquad (26)$$

$$J(r) = \begin{vmatrix} -\frac{\lambda_x}{z} & 0 & \frac{u}{z} & \frac{uv}{\lambda_y} & -\frac{\lambda_x^2 + u^2}{\lambda_x} & \frac{\lambda_x v}{\lambda_y} \\ 0 & -\frac{\lambda_y}{z} & \frac{v}{z} & \frac{\lambda_y^2 + v^2}{\lambda_y} & -\frac{uv}{\lambda_y} & -\frac{\lambda_y u}{\lambda_x} \end{vmatrix}$$

The $$\frac{\partial T(x,y)}{\partial x} \text{ and } \frac{\partial T(x,y)}{\partial y}$$

are differential of T(x,y) in x and y direction.

As the T(x,y) is the binary mask of projection of the model as defined in equation (17). The gradient of T(x,y) are zero except on the boundary C.

$$\nabla T(x,y) = \begin{bmatrix} \frac{\partial T(x,y)}{\partial x} \\ \frac{\partial T(x,y)}{\partial y} \end{bmatrix} = \begin{cases} \neq 0 & \text{if } (x,y) \in C \\ = 0 & \text{else} \end{cases}$$

$$\frac{\partial E_c}{\partial r_i} = \int ((I(x,y) - u_1)^2 - (I(x,y) - u_2)^2)\frac{\partial T(x,y)}{\partial r_i} dxdy \qquad (27)$$
$$= \int_{(x,y) \in C} ((I(x,y) - u_1)^2 - (I(x,y) - u_2)^2)\left(\frac{\partial T(x,y)}{\partial x}\frac{\partial x}{\partial r_i} + \frac{\partial T(x,y)}{\partial y}\frac{\partial y}{\partial r_i}\right) dxdy$$

The Partial Differential of $E_{match}$

The match energy is the cost function to measure the distance the matched feature points in image coordinate between the feature points in the input image and in the projected virtual image.

$$E_{match} = \sum_{1}^{N} w_i * \left\| \begin{bmatrix} u_i \\ v_i \end{bmatrix} - p_i \right\| \qquad (28)$$

where $u = \lambda_x \frac{X_c}{Z_c}$ and $v = \lambda_x \frac{Y_c}{Z_c}$ and

The velocity of (the fixed point) P relative to the camera frame is given by $$\dot{P}=-\Omega \times P - V$$

Similar to the image Jacobian matrix derivate steps, we can get $$\dot{u} = -\frac{\lambda_x}{Z_c}v_x + \frac{u}{Z_c}v_z + \frac{uv}{\lambda_y}w_x - \frac{\lambda_x^2+u^2}{\lambda_x}w_y + \frac{\lambda_x v}{\lambda_y}w_z$$

$$\dot{v} = -\frac{\lambda_y}{Z_c}v_y + \frac{v}{Z_c}v_z + \frac{\lambda_y^2+v^2}{\lambda_y}w_x - \frac{uv}{\lambda_x}w_y - \frac{\lambda_y u}{\lambda_x}w_z$$

$$\frac{\partial E_{match}}{\partial r_i} = \sum_{j=1}^{N} w_j * 2\left((u_j - p_{jx})\frac{\partial u_j}{\partial r_i} + (v_j - p_{jy})\frac{\partial v_j}{\partial r_i}\right) \quad (29)$$

The $$\frac{\partial u_j}{\partial r_i} \text{ and } \frac{\partial v_j}{\partial r_i}$$

can be re-written in the form of the image Jacobian matrix as follows.

$$\begin{bmatrix} \frac{\partial u}{\partial r_1} & \frac{\partial u}{\partial r_2} & \frac{\partial u}{\partial r_3} & \frac{\partial u}{\partial r_4} & \frac{\partial u}{\partial r_5} & \frac{\partial u}{\partial r_6} \\ \frac{\partial v}{\partial r_1} & \frac{\partial v}{\partial r_2} & \frac{\partial v}{\partial r_3} & \frac{\partial v}{\partial r_4} & \frac{\partial v}{\partial r_5} & \frac{\partial v}{\partial r_6} \end{bmatrix} = \quad (30)$$

$$J(r) = \begin{vmatrix} -\frac{\lambda_x}{Z_c} & 0 & \frac{u}{Z_c} & \frac{uv}{\lambda_y} & -\frac{\lambda_x^2+u^2}{\lambda_x} & \frac{\lambda_x v}{\lambda_y} \\ 0 & -\frac{\lambda_y}{Z_c} & \frac{v}{Z_c} & \frac{\lambda_y^2+v^2}{\lambda_y} & -\frac{uv}{\lambda_y} & -\frac{\lambda_y u}{\lambda_x} \end{vmatrix}$$

It should be noted that the partial equation are derived in image and camera coordinate, the 3D feature point $P_j = (X_j^{obj}, Y_j^{obj}, Z_j^{obj})$ will be transformed to camera coordinates when calculate the partial equation.

$$\begin{pmatrix} X_c \\ Y_c \\ Z_c \end{pmatrix} = R_{co}\begin{pmatrix} X_{obj} \\ Y_{obj} \\ Z_{obj} \end{pmatrix} + T_{co} \quad (31)$$

Gaussian Newton Method to Minimize Energy Function

In our implementation, we used Gaussian Newton Method to minimize the energy function. the Gauss-Newton algorithm finds the minimum of the sum of squares.

$$E = \sum_{1}^{M} e^2(r) \quad (32)$$

Starting with an initial guess for the minimum, the method proceeds by the iterations.

$$r^n = r^{n-1} + \Delta r \quad (33)$$

where the increment $\Delta r$ is the solution to the normal equations.

$$e = -J_r \Delta r \quad (34)$$

The task of finding $\Delta r$ minimizing the sum of squares $$\min \|e + J_r \Delta r\|$$

The increment $\Delta r$ is then calculated by $$\Delta r = -(J_r^T J_r)^{-1} J_r^T e \quad (35)$$

For Minimizing Energy $E_c$
For each contour point $(x,y) \in C$, we have $$e_c = (I(x,y) - u_1)^2 - (I(x,y) - u_2)^2$$

and $$J_c = [J_1, J_2, J_3, J_4, J_5, J_6]$$

and $$J_i = \frac{\partial T(x,y)}{\partial x}\frac{\partial x}{\partial r_i} + \frac{\partial T(x,y)}{\partial y}\frac{\partial y}{\partial r_i} \text{ for } i = 1\ldots 6$$

For Minimizing Energy $E_{match}$
For each matched feature point j, $$e_{match} = \begin{bmatrix} e_x \\ e_y \end{bmatrix} = \begin{bmatrix} u_j - p_{jx} \\ v_j - p_{jy} \end{bmatrix} * w_j$$

and $$J_{match} = \begin{bmatrix} -\frac{\lambda_x}{Z_c} & 0 & \frac{u}{Z_c} & \frac{uv}{\lambda_y} & -\frac{\lambda_x^2+u^2}{\lambda_x} & \frac{\lambda_x v}{\lambda_y} \\ 0 & -\frac{\lambda_y}{Z_c} & \frac{v}{Z_c} & \frac{\lambda_y^2+v^2}{\lambda_y} & -\frac{uv}{\lambda_y} & -\frac{\lambda_y u}{\lambda_x} \end{bmatrix} * w_j$$

For Minimizing Energy $E = E_c + E_{match}$
The e and J are obtained by concatenating $e_c$, $\eta e_{match}$ and $J_c$ and $\eta J_{match}$ respectively.

$$e = \begin{bmatrix} e_c \\ \eta * e_{match} \end{bmatrix}$$

and $$J = \begin{bmatrix} J_c \\ \eta * J_{match} \end{bmatrix}$$

The increment $\Delta r$ will be calculated by $$\Delta r = -(J^T J)^{-1} J^T e$$

Update Pose Parameters or Transformation Matrix
The transformation between object coordinate to camera coordinate may be representation by a transformation.

$$X(t) = R(t)X_0 + T(t) \quad (37)$$

In homogeneous representation, the transformation matrix $$g(t) = \begin{bmatrix} R(t) & T(t) \\ 0 & 1 \end{bmatrix} \text{ and } X(t) = g(t)X_0 \quad (38)$$

We will use $g(t) = (R(t), T(t))$ to denote the relative displacement between some fixed frame (object coordinate) and the camera frame at time t. If the camera is at location $g(t_1)$, $g(t_2) \ldots g(t_m)$ at time $t_1, t_2 \ldots t_m$ respectively, then the coordinates of the same point p are given as $X(t_1)=g(t_i)X_0$, $i=1 \ldots m$ correspondingly.

Figure 7:
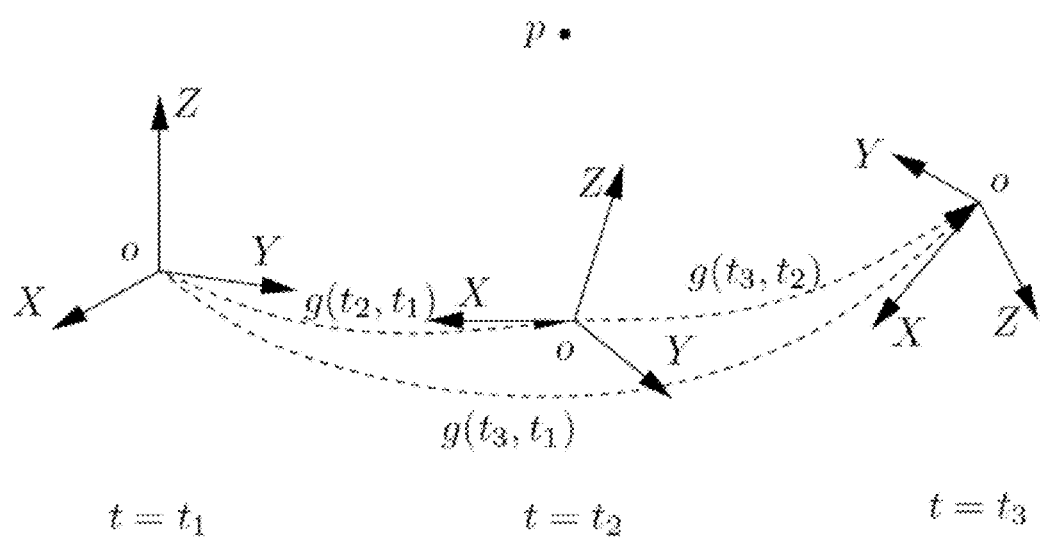
FIG. 7 illustrates the composition of the camera motion.

Referring to FIG. 7, The relative motion between the camera at $t_2$ and $t_1$ will be denote as $g(t_2,t_1)$, then we have the following relationship between coordinates of the same point p.

$$X(t_2)=g(t_2,t_1)X(t_1) \quad (39)$$

Now consider a third position of the camera at $t=t_3$, as shown in FIG. 5. The relative motion between the camera at $t_3$ and $t_2$ is $g(t_3,t_2)$ and between $t_3$ and $t_1$ is $g(t_3,t_1)$. Then we have the following relationship among coordinates $$X(t_3)=g(t_3,t_2)X(t_2)=g(t_3,t_2)g(t_2,t_1)X(t_1) \quad (40)$$

Comparing with the direct relationship between coordinates at $t_3$ and $t_1$ $$X(t_3)=g(t_3,t_1)X(t_1) \quad (41)$$

The composition rule for consecutive motion must hold.

$$g(t_3,t_1)=g(t_3,t_2)g(t_2,t_1) \quad (42)$$

Based on the composition rule, the pose parameter for $$g(t_3,t_1)=g(t_n,t_{n-1})g(t_{n-1},t_1) \quad (43)$$

From the gradient decent method, we can obtain the relative displacement between iteration n−1 to n. As a result, the pose parameter update for iteration n is obtained by calculating $g(t_n, t_{n-1})$.

$$g(t_n, t_{n-1}) = \begin{bmatrix} R & T \\ 0 & 1 \end{bmatrix} \quad (44)$$

The relative displacement is obtained from the control input (the velocity screw) $\dot{r}=[V;\Omega]^T=[v_x,v_y,v_z,w_x,w_y,w_z]^T$ in the iteration. A stepsize function is used to adjust the convergence speed.

$$\Delta r = \quad (45)$$

$$[v_x, v_y, v_z, w_x, w_y, w_z]^T * stepsize = [T_x, T_y, T_z, \phi, \theta, \psi]$$

$$R = Rz * Ry * Rx$$

and $$Rx = \begin{bmatrix} 1 & 0 & 0 \\ 0 & \cos\phi & -\sin\phi \\ 0 & \sin\phi & \cos\phi \end{bmatrix}$$

$$Ry = \begin{bmatrix} \cos\theta & 0 & \sin\theta \\ 0 & 1 & 0 \\ -\sin\theta & 0 & \cos\theta \end{bmatrix}$$

$$Rz = \begin{bmatrix} \cos\psi & -\sin\psi & 0 \\ \sin\psi & \cos\psi & 0 \\ 0 & 0 & 1 \end{bmatrix}$$

and $$T = \begin{bmatrix} T_x \\ T_y \\ T_z \end{bmatrix}$$

Therefore, we can obtain $$g(t_n, t_{n-1}) = \begin{bmatrix} R & T \\ 0 & 1 \end{bmatrix} = \begin{bmatrix} R_z R_y R_x & T \\ 0 & 1 \end{bmatrix} \quad (46)$$

and the new transformation matrix from object to camera coordinate will be $$g(t_n,t_1)=g(t_n,t_{n-1})g(t_{n-1},t_1) \quad (47)$$

Implementation

The pose estimation is modeled as an optimization or minimization of an energy function. Iteratively pose updates will be calculated to minimize the energy. The following is an exemplary implementation of the method detailed above:

Step 1: Input image, model, camera parameters

Step 2: Get initial pose parameters

Step 3: Project model into virtual image by OpenGL using given pose parameters. The binary mask image $T(x,y)$ and corresponding depth information/map are obtained.

Step 4: Calculate the velocity screw for iteratively updating the pose. (i) Calculate the mean value inside and outside the object by equation (18). (ii). Get the contour C from binary mask and 3D contour points using depth information. (iii) Calculate the gradient $\nabla T(x,y)$ in x and y direction for contour points. (iv) Calculate image Jacobian matrix using equation (26) (iv) Calculate the gradient flow using equation (27) and get the control input (velocity screw) by equation (35) using the Gaussian Newton method Step 5: Calculate relative displacement using the control input (velocity screw) and given stepsize by equation (45)

Step 6: Update the pose parameters by equation (46) and (47)

Step 7: If changes of the pose parameters are very small or if maximum iterations are reached, go to END, else go back Step 3.

Step 8: END

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for estimating a pose of an object from an input image and storing an object pose estimation, comprising:
inputting an image containing an object;
creating a first binary mask of the input image;
extracting a set of singlets from the first binary mask of the input image, each singlet representing points of maximum curvature within a contour-tracing window along an inner contour and along an outer contour of the object in the input image;
producing a duplex matrix including: defining a matrix D with its elements, i.e. (i,j), containing the distance between the i-th and the j-th singlets, modifying matrix D by removing any matrix D elements whose distance is not within a predefined minimum value and a maximum value, identifying all singlets s1 coupled to more than a predefined number of other singlets as determined from the modified matrix D, producing a reduced matrix D by removing from the modified matrix D all elements along row s1 and column s1, and for each remaining element within the reduced matrix D calculating multiple angle measures of the two singlets defined by the remaining element, each element of the duplex matrix including said multiple angle measures and the distance between their two corresponding singlets;
comparing the produced duplex matrix to a reference duplex matrix to produce a set of candidate poses; and producing an object pose estimate, and storing the object pose estimate.

2. A method for estimating a pose of an object as in claim 1, wherein said reference duplex matrix is defined from multiple different views of an example of said object, said example of said object being defined by a CAD model and each of the different views being simulated from the CAD model.

3. A method for estimating a pose of an object as in claim 1, wherein:
said extracting a set of singlets includes storing for each singlet its in-coming angle and its out-going angle; and
said calculating multiple angle measures includes, for the two singlets (s1,s2) in each remaining element within the reduced matrix D, calculate the angle that connects s1 and s2 as a value termed ANGLE, the length of the line that connects s1 and s2 as a value termed DISTANCE, the difference between ANGLE and the incoming angle of s1 is a value termed s1.in-coming, the difference between ANGLE and the out-going angle of s1 is value termed s1.out-going, the difference between ANGLE and the incoming angle of s2 is a value termed s2.in-coming, the difference between ANGLE and the out-going angle of s2 is a value termed s2.out-going, and each duplet element includes at least the six parameters defined as: <ANGLE, DISTANCE, s1.in-coming, s1.out-going, s2.in-coming, s2.out-going>.

4. A method for estimating a pose of an object as in claim 3, wherein said comparing the produced duplex matrix, i.e. D1, to a reference duplex matrix, i.e. D2, to produce a set of candidate poses includes:
defining an angle threshold termed THRESHOLD;
for any duplet d1 in D1 and any duplet d2 in D2, IF the following conditions are all satisfied:

$|d1.s1.\text{in-coming}-d2.s1.\text{in-coming}|<\text{THRESHOLD},$ $|d1.s1.\text{out-going}-d2.s1.\text{out-going}|<\text{THRESHOLD},$ $|d1.s2.\text{in-coming}-d2.s2.\text{in-coming}|<\text{THRESHOLD},$ $|d1.s2.\text{out-going}-d2.s2.\text{out-going}|<\text{THRESHOLD},$ THEN add the candidate pose (d1.length/d2.length, d1.angle-d2.angle) to a list of candidate poses.

5. A method for estimating a pose of an object as in claim 1, wherein said producing a reduced matrix D includes:
definig an S×1 array, i.e. DEG(s), wherein each element of array DEG(s) contains the number of singlets that are connected to the s-th singlet as determined from the modifying matrix D;
identify as (s1,s2) the element of modified matrix D that has the smallest distance value;
IF DEG(s1) is greater than said predefined number of other singlets, THEN for all s, remove from the modified matrix D all elements (s,s1) and (s1,s); and
IF DEG(s2) is greater than said predefined number of other singlets, THEN for all s, remove from the modified matrix D all elements (s,s2) and (s2,s).

6. A method for estimating a pose of an object as in claim 1 further comprising extracting inner and outer contours of the object.

7. A method for estimating a pose of an object as in claim 1 further comprising refining the object pose estimate by modeling the object pose estimate as an optimization of an energy function.

8. A method for estimating a pose of an object as in claim 7 further comprising calculating pose estimates iteratively to minimize an energy value in the energy function.

9. A method for estimating a pose of an object as in claim 8 further comprising calculating a velocity screw to iteratively calculate pose estimates.

10. A method for estimating a pose of an object as in claim 7 further comprising projecting a model contour curve of the object into a virtual image using an rendering application programming interface (API).

11. A method for refining an estimated pose of an object as in claim 1, comprising:
inputting a model of the object and parameters of a camera used to take the image of the object in the estimated pose as determined from the object pose estimate;
projecting the model of the object into a virtual image of the object using the parameters of the camera and initial pose parameters to obtain a second binary mask image and image depth information;
updating the initial pose parameters to new pose parameters using the second binary mask image and image depth information and updating the new pose parameters iteratively to minimize an energy function or until a maximum number of iterations is reached.

12. A method for refining an estimated pose of an object as in claim 11, further comprising:
calculating a mean value inside and outside the object using a cost function; and
calculating a contour C of the object from the second binary mask image and 3D contour points using the image depth information.

13. A method for refining an estimated pose of an object as in claim 12, further comprising:
calculating a gradient $\nabla T(x,y)$ in x and y direction for the contour points;
calculating the image Jacobian matrix; and
calculating a gradient flow and velocity screw using a Gaussian Newton method.

14. A method for refining an estimated pose of an object as in claim 13, further comprising:
calculating a relative displacement using the velocity screw and a given stepwise.

15. A method for refining an estimated pose of an object as in claim 11, wherein the image of an object in an estimated pose is formed by:
inputting an image containing an object;
creating a binary mask of the input image;
extracting a set of singlets from the binary mask of the input image, each singlet representing points in an inner and outer contour of the object in the input image;
connecting the set of singlets into a mesh represented as a duplex matrix;
comparing two duplex matrices to produce a set of candidate poses; and
producing an object pose estimate.

16. An apparatus for estimating a pose of an object from an input image and storing an object pose estimation, comprising:
a processor that
receives an input image containing an object;
creates a binary mask of the input image;
extracts a set of singlets from the binary mask of the input image, each singlet representing points of maximum curvature within a contour-tracing window along an inner contour and along an outer contour of the object in the input image;
produces a duplex matrix, including: defining a matrix D with its elements, i.e. (i,j), containing the distance between the i-th and the j-th singlets, modifying matrix D by removing any matrix D elements whose distance is not within a predefined minimum value and a maximum value, identifying all singlets s1 coupled to more than a predefined number of other singlets as determined from the modified matrix D, producing a reduced matrix D by removing from the modified matrix D all elements along row s1 and column s1, and for each remaining element within the reduced matrix D calculating multiple angle measures of the two singlets defined by the remaining element, each element of the duplex matrix including said multiple angle measures and the distance between their two corresponding singlets;

compares the produced duplex matrix to a reference duplex matrix to produce a set of candidate poses; and produces an object pose estimate; and a memory that stores the object pose estimate.

17. An apparatus for estimating a pose of an object as in claim 16 wherein said reference duplex matrix is defined from multiple different views of an example of said object, said example of said object being defined by a CAD model and each of the different views being simulated from the CAD model.

18. An apparatus for estimating a pose of an object as in claim 16, wherein:

said extracting a set of singlets includes storing for each singlet its in-coming angle and its out-going angle; and said calculating multiple angle measures includes, for the two singlets (s1,s2) in each remaining element within the reduced matrix D, calculate the angle that connects s1 and s2 as a value termed ANGLE, the length of the line that connects s1 and s2 as a value termed DISTANCE, the difference between ANGLE and the incoming angle of s1 is a value termed s1.in-coming, the difference between ANGLE and the out-going angle of s1 is value termed s1.out-going, the difference between ANGLE and the incoming angle of s2 is a value termed s2.in-coming, the difference between ANGLE and the out-going angle of s2 is a value termed s2.out-going, and each duplet element includes at least the six parameters defined as: <ANGLE, DISTANCE, s1.in-coming, s1.out-going, s2.in-coming, s2.out-going>.

19. An apparatus for estimating a pose of an object as in claim 18, wherein said comparing the produced duplex matrix, i.e. D1 to a reference duplex matrix, i.e. D2, to produce a set of candidate poses includes:

defining an angle threshold termed THRESHOLD;

for any duplet d1 in D1 and any duplet d2 in D2, IF the following conditions are all satisfied:

$|d1.s1.\text{in-coming} - d2.s1.\text{in-coming}| < \text{THRESHOLD}$, $|d1.s1.\text{out-going} - d2.s1.\text{out-going}| < \text{THRESHOLD}$, $|d1.s2.\text{in-coming} - d2.s2.\text{in-coming}| < \text{THRESHOLD}$, $|d1.s2.\text{out-going} - d2.s2.\text{out-going}| < \text{THRESHOLD}$, THEN add the candidate pose (d1.length/d2.length, d1.angle-d2.angle) to a list of candidate poses.

20. One or more tangible, non-transitory computer-readable media having computer-readable instructions thereon, which, when executed by a processor, estimates a pose of an object from an input image according to the method of claim 1.

* * * * *